United States Patent
Takeuchi et al.

(10) Patent No.: US 6,550,265 B2
(45) Date of Patent: Apr. 22, 2003

(54) EJECTOR CYCLE SYSTEM

(75) Inventors: Hirotsugu Takeuchi, Nagoya (JP); Yasushi Yamanaka, Nakashima-gun (JP); Hiroshi Oshitani, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/082,388

(22) Filed: Feb. 25, 2002

(65) Prior Publication Data

US 2002/0124592 A1 Sep. 12, 2002

(30) Foreign Application Priority Data

Mar. 1, 2001 (JP) ........................... 2001-057260
Jul. 9, 2001 (JP) ........................... 2001-208011

(51) Int. Cl.[7] ............................................. F25B 13/00
(52) U.S. Cl. ................... 62/324.2; 62/116; 62/500; 62/191; 62/511
(58) Field of Search ................... 62/116, 500, 191, 62/324.2, 511

(56) References Cited

U.S. PATENT DOCUMENTS

| | | | | |
|---|---|---|---|---|
| 3,750,416 A | * | 8/1973 | Kuhlenschmidt | 62/101 |
| 3,922,877 A | * | 12/1975 | Ophir et al. | 62/238 |
| 4,261,716 A | * | 4/1981 | Schwartz et al. | 55/387 |
| 5,343,711 A | * | 9/1994 | Kornhauser et al. | 62/116 |
| 5,647,221 A | * | 7/1997 | Garris, Jr. | 62/116 |
| 6,138,456 A | * | 10/2000 | Garris | 60/649 |

* cited by examiner

*Primary Examiner*—Henry Bennett
*Assistant Examiner*—Mark S. Shulman
(74) *Attorney, Agent, or Firm*—Harness, Dickey & Pierce, PLC (57) ABSTRACT

In an ejector cycle system, high-pressure side refrigerant is decompressed by an ejector in cooling operation for cooling a compartment, and is decompressed by a fixed restrictor in heating operation for heating the compartment. Therefore, in the heating operation, the pressure of refrigerant to be sucked into a compressor can be made lower, and the temperature of refrigerant discharged from the compressor is increased. Alternatively, in the cooling operation, a flow direction of refrigerant flowing through at least one of an exterior heat exchanger and an interior heat exchanger is identical to that in the heating operation.

17 Claims, 8 Drawing Sheets

EJECTOR CYCLE SYSTEM

CROSS-REFERENCE TO RELATED APPLICATION

This application is related to Japanese Patent Applications No. 2001-57260 filed on Mar. 1, 2001, and No. 2001-208011 filed on Jul. 9, 2001, the contents of which are hereby incorporated by reference.

BACKGROUND OF THE INVENTION

1. Field of the Invention

The present invention relates to an ejector cycle system having an ejector. The ejector sucks gas refrigerant evaporated at a lower pressure side, and increases a pressure of refrigerant to be sucked into a compressor by converting an expansion energy to a pressure energy.

2. Description of Related Art

In a conventional ejector cycle system described in JP-U-55-26273, refrigerant-flowing direction in each of an interior heat exchanger and an exterior heat exchanger during a cooling operation is opposite to that during a heating operation. In this case, if a dimension of a refrigerant passage in each of the interior heat exchanger and the exterior heat exchanger is set to be suitable for the cooling operation, it is difficult to be suitable for the heating operation. Accordingly, it is difficult to improve heat-exchanging performance in each of the interior heat exchanger and the exterior heat exchanger, for both the cooling operation and the heating operation.

On the other hand, in a conventional ejector cycle system disclosed in JP-Y-59-13571, an ejector for the cooling operation and an another ejector for the heating operation are provided, and one of both the ejectors is switched for each of the cooling and heating operations. In this case, since refrigerant is decompressed and expanded only by the any one ejector, the pressure of refrigerant to be sucked into a compressor is higher than that in a general refrigerant cycle where refrigerant is decompressed and expanded by a decompression device such as an expansion valve and a capillary tube. Thus, when the pressure of refrigerant discharged from a compressor in this ejector cycle system is identical to that in the general refrigerant cycle, the temperature of a high-pressure side refrigerant in this ejector cycle system becomes lower than that in the general refrigerant cycle. Accordingly, in the heating operation, heating performance cannot be sufficiently improved.

SUMMARY OF THE INVENTION

In view of the foregoing problems, it is an object of the present invention to provide an ejector cycle system which improves heat-exchanging performance in an exterior heat exchanger and in an interior heat exchanger.

It is an another object of the present invention to provide an ejector cycle system with cooling operation and heating operation, which sufficiently increases heating temperature in the heating operation.

According to a first aspect of the present invention, in an ejector cycle system with an ejector having a nozzle and a pressure-increasing portion, the flow direction of refrigerant, flowing through at least one of an exterior heat exchanger and an interior heat exchanger in a cooling operation where heat is radiated from a compartment to an outside, is identical to that in a heating operation where heat is radiated from the outside to the compartment. Accordingly, heat-exchanging performance can be effectively improved in at least one of the exterior and interior heat exchangers. Because the flow direction of refrigerant flowing through at least one of the exterior heat exchanger and the interior heat exchanger can be set identical in both the cooling operation and the heating operation, a special member such as a refrigerant distribution member (e.g., a throttle) can be disposed at a refrigerant inlet side in each of the exterior heat exchanger and the interior heat exchanger, for example. In this case, refrigerant-distribution performance in each of the exterior heat exchanger and the interior heat exchanger can be improved.

In the ejector cycle system of the present invention, first to fourth switching units are disposed, so that the flow direction of refrigerant flowing through each of the exterior heat exchanger and the interior heat exchanger can be set identical in both the cooling operation and the heating operation. The first switching unit is disposed to switch one of a case where refrigerant flows from the compressor toward the exterior heat exchanger and a case where refrigerant flows from the compressor toward the interior heat exchanger. The second switching unit is disposed to switch one of a case where liquid refrigerant flows from the gas-liquid separator toward the interior heat exchanger and a case where liquid refrigerant flows from the gas-liquid separator toward the exterior heat exchanger. The third switching unit is disposed to switch one of a case where refrigerant flows from the exterior heat exchanger into the nozzle of the ejector and a case where refrigerant flows from the interior heat exchanger into the nozzle of the ejector. The fourth switching unit is disposed to switch one of a case where refrigerant flows from the interior heat exchanger into the pressure-increasing portion of the ejector and a case where refrigerant flows from the exterior heat exchanger into the pressure-increasing portion of the ejector.

According to a second aspect of the present invention, in an ejector cycle system having the ejector, a decompression unit for decompressing refrigerant flowing from the interior heat exchanger is disposed. In addition, in the cooling operation for cooling the compartment, the high-pressure side refrigerant is decompressed by the ejector. On the other hand, in the heating operation for heating the compartment, the high-pressure side refrigerant is decompressed by the decompression unit. Accordingly, in the heating operation, the pressure of refrigerant to be sucked into a compressor can be made lower, and the temperature of refrigerant discharged from the compressor is increased. As a result, heating performance can be improved in the heating operation, while cooling performance is improved in the cooling operation.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–3. In the first embodiment, an ejector cycle system of the present invention is typically used for a vehicle air conditioner.

Figure 1:
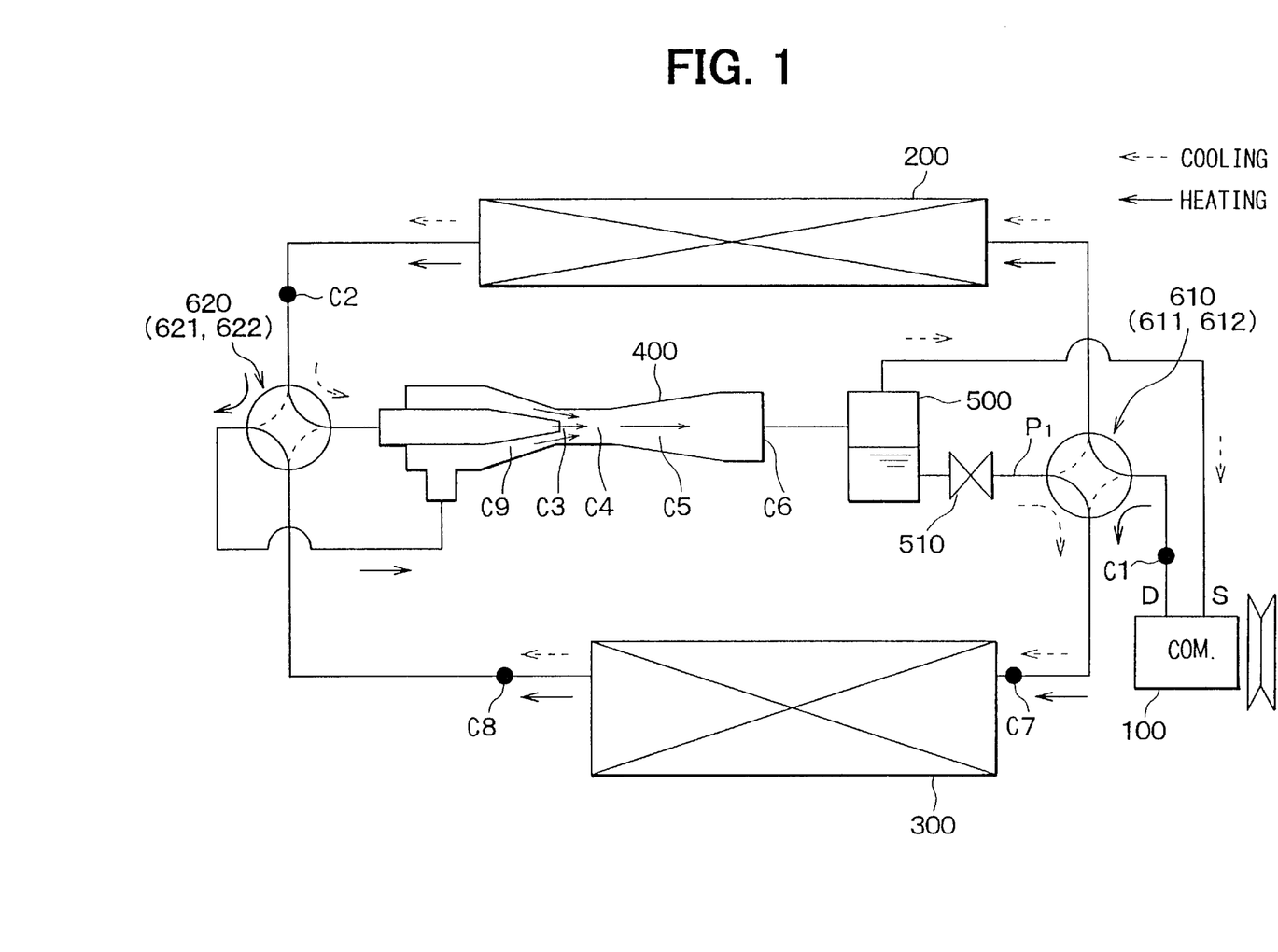
FIG. 1 is a schematic diagram showing an ejector cycle system according to a first preferred embodiment of the present invention.

As shown in FIG. 1, a compressor 100 is driven by a driving source such as a vehicle engine (not shown) to suck and compress refrigerant (e.g., carbon dioxide in the first embodiment). In an exterior heat exchanger 200, refrigerant in the ejector cycle system is heat-exchanged with air (outside air) outside a passenger compartment. In an interior heat exchanger 300, refrigerant in the ejector cycle system is heat-exchanged with air to be blown into a passenger compartment. An ejector 400 decompresses and expands refrigerant at a high pressure side so that gas refrigerant evaporated at a low pressure side is sucked therein, and converts an expansion energy to a pressure energy to increase a pressure of refrigerant to be sucked into the compressor 100.

Figure 2:
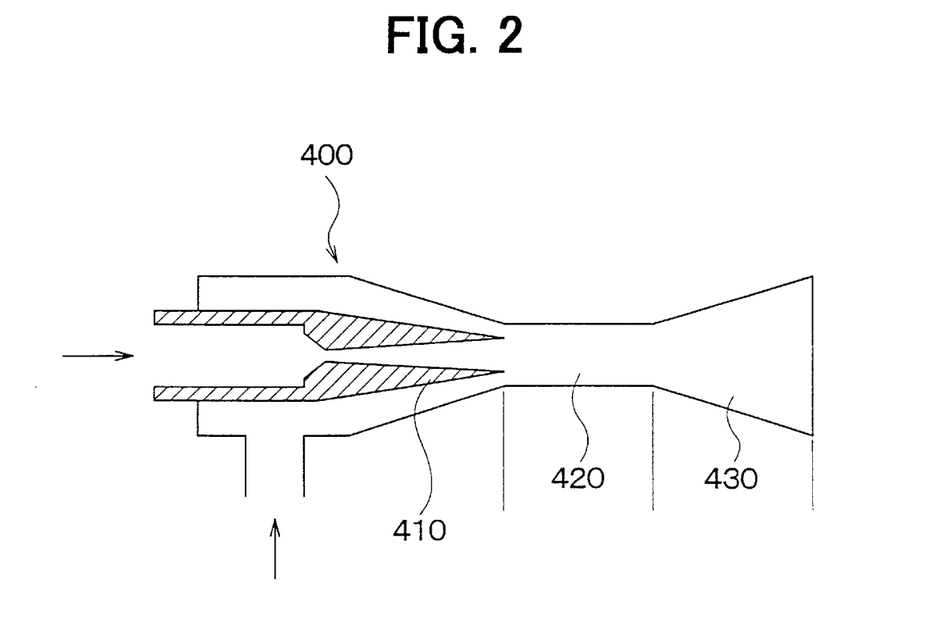
FIG. 2 is an enlarged schematic diagram showing an ejector used in the ejector cycle system according to the first embodiment.
Figure 3:
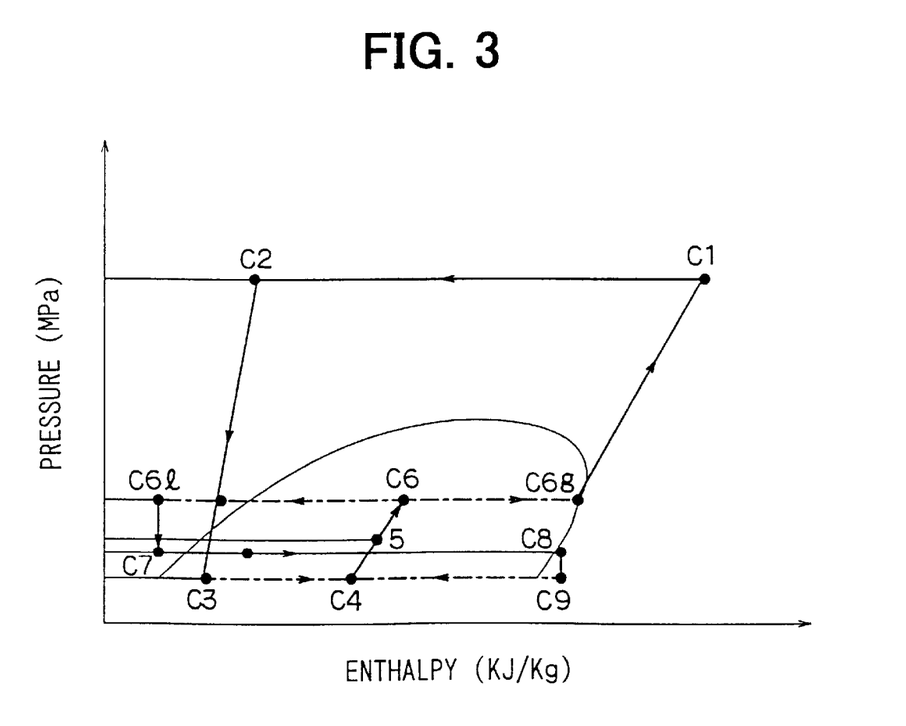
FIG. 3 is a Mollier diagram showing an operation of the ejector cycle system according to the first embodiment.

As shown in FIG. 2, the ejector 400 includes a nozzle 410, a mixing portion 420 and a diffuser 430. The nozzle 410 decompresses and expands the refrigerant at the high pressure side by converting a pressure energy (pressure head) of the refrigerant to a speed energy (speed head) thereof. In the mixing portion 420, the refrigerant evaporated at the low pressure side is sucked by high-speed refrigerant jetted from the nozzle 410. In the diffuser 430, the speed energy of refrigerant is converted to the pressure energy so that the pressure of refrigerant to be sucked into the compressor 100 is increased, while the refrigerant jetted from the nozzle 410 and the refrigerant sucked into the mixing portion 420 are mixed.

Here, the refrigerant pressure from the ejector 400 is increased not only in the diffuser 430, but also in the mixing portion 420 when the refrigerant, evaporated at the low pressure side, is sucked. Therefore, in the ejector 400, a pressure-increasing portion is constructed by the mixing portion 420 and the diffuser 430. In the first embodiment, a cross-sectional area of the mixing portion 420 is made constant until the diffuser 430. However, the mixing portion 420 may be tapered so that the cross-sectional area becomes larger toward the diffuser 430.

As shown in FIG. 1, refrigerant from the ejector 400 flows into a gas-liquid separator 500, to be separated into gas refrigerant and liquid refrigerant in the gas-liquid separator 500. The gas refrigerant separated in the gas-liquid separator 500 is sucked into the compressor 100, and the separated liquid refrigerant is sucked into a low-pressure side heat exchanger. Here, the low-pressure side heat exchanger is a heat exchanger where refrigerant is evaporated. Specifically, the low-pressure side heat exchanger is the interior heat exchanger 300 in the cooling operation, or is the exterior heat exchanger 200 in the heating operation. On the other hand, a high-pressure side heat exchanger is a heat exchanger for cooling high-pressure side refrigerant discharged from the compressor 100. Specifically, the high-pressure side heat exchanger is the exterior heat exchanger 200 in the cooling operation, or is the interior heat exchanger 300 in the heating operation.

The gas-liquid separator 500 is connected to the low-pressure side heat exchanger through a refrigerant passage P1. In the refrigerant passage P1, a restriction device 510 such as a capillary tube and a fixed restrictor is provided. When refrigerant flows through the restriction device 510, a predetermined pressure loss occurs, and the refrigerant to be sucked into the low-pressure side heat exchanger is decompressed. Therefore, the pressure (evaporation pressure) of the refrigerant to be introduced into the low-pressure side heat exchanger can be sufficiently decreased.

A first switching valve 611 is disposed to switch one of a case where refrigerant flows from the compressor 100 toward the exterior heat exchanger 200 and a case where refrigerant flows from the compressor 100 toward the interior heat exchanger 300. A second switching valve 612 is disposed to switch one of a case where liquid refrigerant flows from the gas-liquid separator 500 toward the interior heat exchanger 300, and a case where liquid refrigerant flows from the gas-liquid separator 500 toward the exterior heat exchanger 200. In the first embodiment, a first four-way valve 610, constructed by the first and second switching valves 611, 612 integrated to each other, is used.

A third switching valve 621 is disposed to switch one of a case where refrigerant flows from the exterior heat exchanger 200 into the nozzle 410, and a case where refrigerant flows from the interior heat exchanger 300 into the nozzle 410. A fourth switching valve 622 is disposed to switch one of a case where refrigerant flows from the interior heat exchanger 300 into the mixing portion 420 and a case where refrigerant flows from the exterior heat exchanger 200 into the mixing portion 420. In the first embodiment, a second four-way valve 620, constructed by the third and fourth switching valves 621, 622 integrated to each other, is used.

Next, cooling operation and heating operation of the ejector cycle system according to the first embodiment will be now described.

In the cooling operation for cooling the passenger compartment, the first and second four-way valves 610, 620 are switched to become the states indicated by solid lines in FIG. 1, respectively. Thus, gas refrigerant from the gas-liquid separator 500 is sucked into the compressor 100 as indicated by "S" in FIG. 1, so that the gas refrigerant is compressed in the compressor 100 to be high-pressure and high-temperature refrigerant. High-pressure and high-temperature refrigerant is discharged from the compressor 100 as indicated by "D" in FIG. 1, into the exterior heat exchanger 200, to be cooled and condensed by outside air in the exterior heat exchanger 200. The high-pressure liquid refrigerant flows from the exterior heat exchanger 200 into the ejector 400, to be decompressed and expanded by the nozzle 410 of the ejector 400.

In the mixing portion 420 of the ejector 400, gas refrigerant sucked from the interior heat exchanger 300 is mixed with the refrigerant jetted from the nozzle 410. The pressure of the mixed refrigerant is increased in the mixing portion 420 and the diffuser 430, and the mixed refrigerant flows into the gas-liquid separator 500 from the ejector 400. At this time, since refrigerant in the interior heat exchanger 300 is sucked into the ejector 400, liquid refrigerant flows from the gas-liquid separator 500 into the interior heat exchanger 300. In the interior heat exchanger 300, the sucked liquid refrigerant absorbs heat from air to be blown into the passenger compartment, and is evaporated.

That is, in the cooling operation, refrigerant discharged from the compressor 100 flows into the exterior heat exchanger 200 from the right side in FIG. 1. Then, the refrigerant flows out from the exterior heat exchanger 200 from the left side in FIG. 1. Further, refrigerant to be sucked into the ejector 400 flows into the interior heat exchanger 300 from the right side in FIG. 1, and flows out from the interior heat exchanger 300 from the left side in FIG. 1. In FIG. 3, refrigerant states of the ejector cycle system in the cooling operation at different positions (e.g., C1, C2, C3 . . . ) in FIG. 1 are indicated. As shown in FIG. 3, in the ejector cycle system, the cooling performance in the cooling operation can be improved.

In the heating operation, the first and second four-way valves 610, 620 are switched to the states indicated by broken lines, respectively. Thus, gas refrigerant from the gas-liquid separator 500 is sucked into the compressor 100 to be compressed therein. High-pressure and high-temperature refrigerant discharged from the compressor 100 flows into the interior heat exchanger 300, and is cooled and condensed in the interior heat exchanger 300 by air to be blown into the passenger compartment. Therefore, in the heating operation, air passing through the interior heat exchanger 300 is heated. The high-pressure liquid refrigerant flows from the interior heat exchanger 300 into the ejector 400, and is decompressed and expanded in the nozzle 410 of the ejector 400 to become a gas-liquid two-phase state.

In the mixing portion 420 of the ejector 400, gas refrigerant sucked from the exterior heat exchanger 200 is mixed with the refrigerant jetted from the nozzle 410. The pressure of the mixed refrigerant is increased in the mixing portion 420 and the diffuser 430, and the mixed refrigerant flows into the gas-liquid separator 500 from the ejector 400. At this time, since refrigerant in the exterior heat exchanger 200 is sucked into the ejector 400, liquid refrigerant flows from the gas-liquid separator 500 into the exterior heat exchanger 200. In the exterior heat exchanger 200, the liquid refrigerant from the gas-liquid separator 500 absorbs heat from outside air, and is evaporated.

That is, in the heating operation, refrigerant discharged from the compressor 100 flows into the interior heat exchanger 300 from the right side in FIG. 1. Then, the refrigerant flows out from the interior heat exchanger 300 from the left side in FIG. 1. Further, refrigerant to be sucked into the ejector 400 flows into the exterior heat exchanger 200 from the right side in FIG. 1, and flows out from the exterior heat exchanger 200 from the left side in FIG. 1.

That is, the flow direction of refrigerant flowing through each of the exterior heat exchanger 200 and the interior heat exchanger 300 is identical in both the cooling operation and the heating operation. Accordingly, the ejector cycle system can be constructed by using a simple refrigerant piping structure. Further, since refrigerant-flowing direction in the cooling operation is identical to that in the heating operation in the exterior heat exchanger 200, operation performance of the exterior heat exchanger 200 can be effectively improved.

In the cooling operation of the ejector cycle system, heat is radiated from the passenger compartment to the outside of the passenger compartment. On the other hand, in the heating operation, heat is radiated from the outside of the passenger compartment into the interior of the passenger compartment. Since the refrigerant-flowing direction in the cooling operation is identical to that in the heating operation in the interior heat exchanger 300, operation performance of the interior heat exchanger 300 can be effectively improved.

When a multi-flow type heat exchanger including plural tubes communicating with header tanks is used as the interior heat exchanger 300 and the exterior heat exchanger 200, a refrigerant distribution member such as a throttle member can be readily provided in a refrigerant inlet side of the heat exchanger so that refrigerant-distribution performance in the plural tubes of the heat exchanger can be improved. In the first embodiment, because the refrigerant-flowing direction in the cooling operation is equal to that in the heating operation in the exterior heat exchanger 200 and the interior heat exchanger 300, the heat-exchanging performance of the heat exchangers 200, 300 can be effectively improved by providing the throttle member in the refrigerant inlet side.

As described above, in the first embodiment of the present invention, the heat-exchanging performance of the exterior and interior heat exchangers 200, 300 can be effectively improved. Therefore, the ejector cycle system can be effectively operated in both of the heating operation and in the cooling operation.

A second preferred embodiment of the present invention will be now described with reference to FIGS. 4 and 5. In the above-described first embodiment of the present invention, in both of the cooling operation and the heating operation, high-pressure side refrigerant is decompressed in the nozzle 410 of the ejector 400. However, in the second embodiment, in the heating operation, the high-pressure side refrigerant is decompressed and expanded by a decompression device 640 such as a thermal expansion valve, a capillary tube, and an orifice (fixed restrictor). On the other hand, in the cooling operation, the high-pressure side refrigerant is decompressed and expanded by the ejector 400 (nozzle 410) as in the first embodiment.

Figure 4:
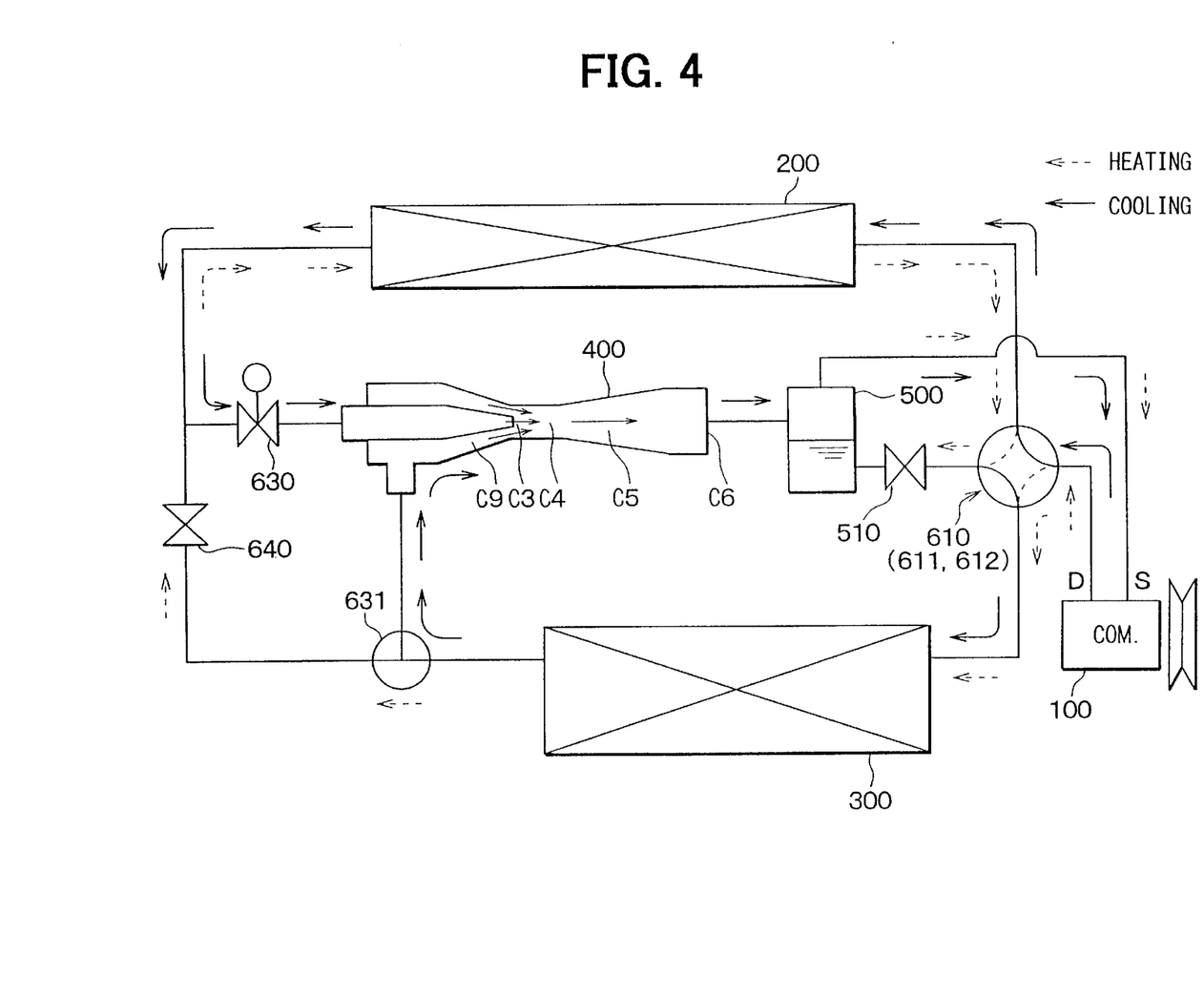
FIG. 4 is a schematic diagram showing an ejector cycle system according to a second preferred embodiment of the present invention.
Figure 5:
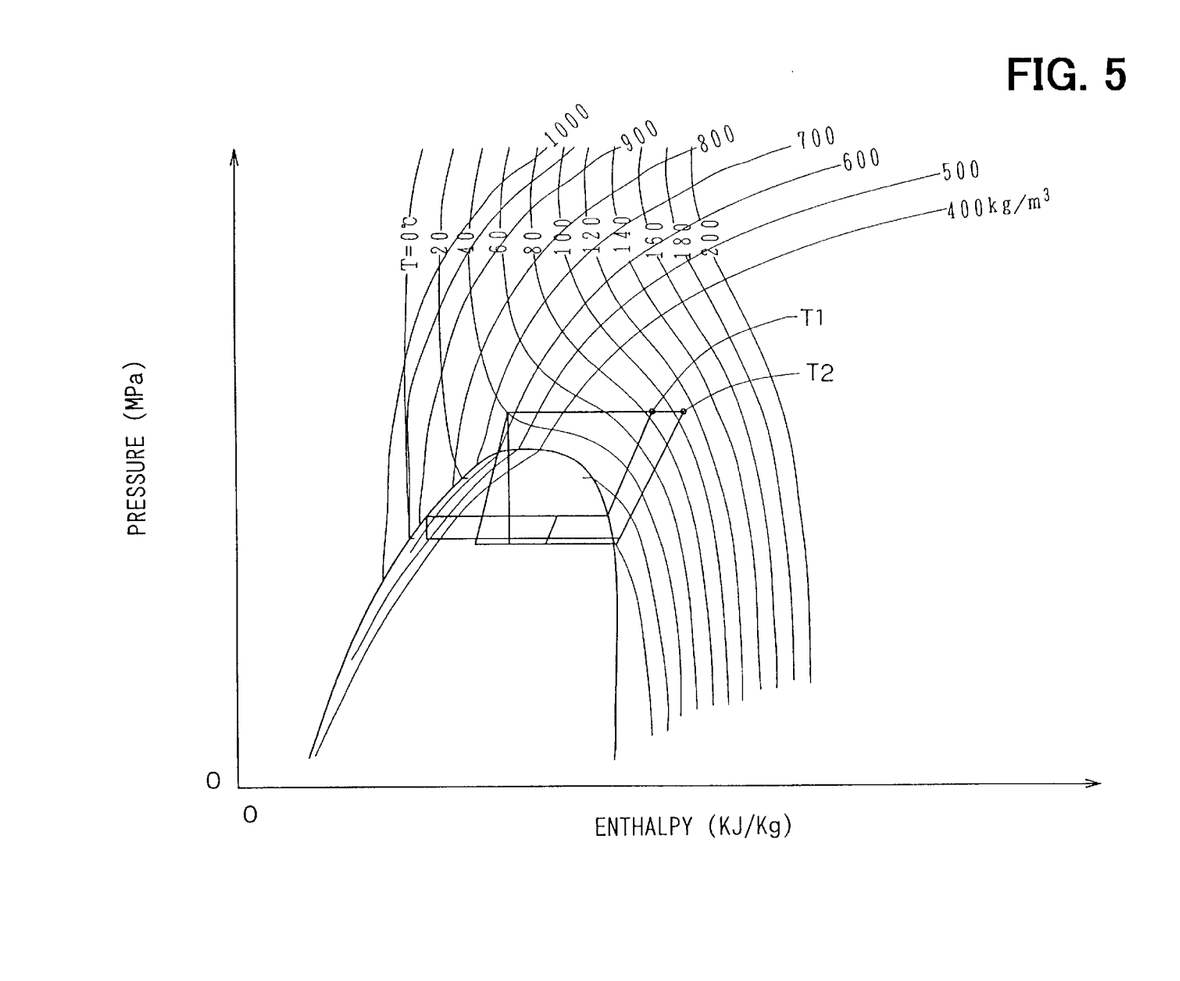
FIG. 5 is a Mollier diagram (p-h diagram) of refrigerant (carbon dioxide) in the ejector cycle system.

Specifically, as shown in FIG. 4, a solenoid two-way valve 630 for opening and closing a refrigerant passage is provided at a refrigerant instruction side of the nozzle 410 of the ejector 400. Further, a decompression device (e.g., a fixed restrictor in the second embodiment) 640 is provided in a refrigerant passage through which the exterior heat exchanger 200 is connected to a refrigerant outlet side of the interior heat exchanger 300. A three-way valve 631 is provided in a refrigerant passage to switch any one of a case where refrigerant flows from the interior heat exchanger 300 into the mixing portion 420 of the ejector 400 and a case where refrigerant flows from the interior heat exchanger 300 to the fixed restrictor 640.

Next, the cooling operation and the heating operation of the ejector cycle system according to the second embodiment will be now described.

In the cooling operation, refrigerant discharged from the compressor 100 flows through the first four-way valve 610, the exterior heat exchanger 200, the two-way valve 630, the ejector 400, the gas-liquid separator 500 and the first four-way valve 610 in this order, and flows into the compressor 100. Further, liquid refrigerant from the gas-liquid separator 500 flows through the restriction device 510, the first four-way valve 610, the interior heat exchanger 300 and the ejector 400 (the mixing portion 420, the diffuser 430) in this order, and is introduced into the gas-liquid separator 500. Thus, in the interior heat exchanger 300, liquid refrigerant from the gas-liquid separator 500 absorbs heat from air to be blown into the passenger compartment, and is evaporated. Therefore, air passing through the interior heat exchanger 300 is cooled. On the other hand, in the exterior heat exchanger 200, gas refrigerant from the compressor 100 is cooled and condensed by outside air, so that heat absorbed from the air to be blown into the passenger compartment is radiated to atmospheric air.

In the heating operation, refrigerant from the compressor 100 flows into the compressor 100 through the first four-way valve 610, the interior heat exchanger 300, the fixed restrictor 640, the exterior heat exchanger 200, the first four-way valve 610 and the gas-liquid separator 500 in this order. Thus, in the interior heat exchanger 300, high-temperature gas refrigerant from the compressor 100 is heat-exchanged with air to be blown into the passenger compartment, and is condensed. Therefore, air to be blown into the passenger compartment is heated in the interior heat exchanger 300. On the other hand, in the exterior heat exchanger 200, liquid refrigerant is heat-exchanged with outside air, and is evaporated. Therefore, the liquid refrigerant absorbs heat from the outside air to be evaporated in the exterior heat exchanger 200.

As described above, in the second embodiment, the high-pressure side refrigerant is decompressed and expanded by the ejector 400 in the cooling operation. However, in the heating operation, the high-pressure side refrigerant is decompressed by the fixed restrictor 640. Here, if refrigerant is decompressed and expanded by an ejector, the pressure of refrigerant sucked into a compressor becomes higher than that in a refrigerant cycle where refrigerant is decompressed by a decompression device such as an expansion valve and a capillary tube. In FIG. 5, T1 indicates the temperature of high-pressure side refrigerant in the heating operation using the ejector 400, and T2 indicates the temperature of high-pressure side refrigerant in the heating operation using the decompression device 640, when the refrigerant pressure discharged from the compressor is set at the same pressure in both cases. As shown in FIG. 5, the temperature T2 of high-pressure side refrigerant becomes higher when the decompression device 640 is used in the heating operation, as compared with the temperature T1 of the high-pressure side refrigerant in the case where the ejector 400 is used in the heating operation for decompression.

Accordingly, in the second embodiment, the heating temperature can be increased in the heating operation, and both the cooling performance and the heating performance can be improved in the heating and cooling operations. Since the fixed restrictor 640 is used as the decompression device 640, production cost of the ejector cycle system can be reduced as compared with an ejector cycle system using two ejectors for both the cooling operation and the heating operation.

Figure 6:
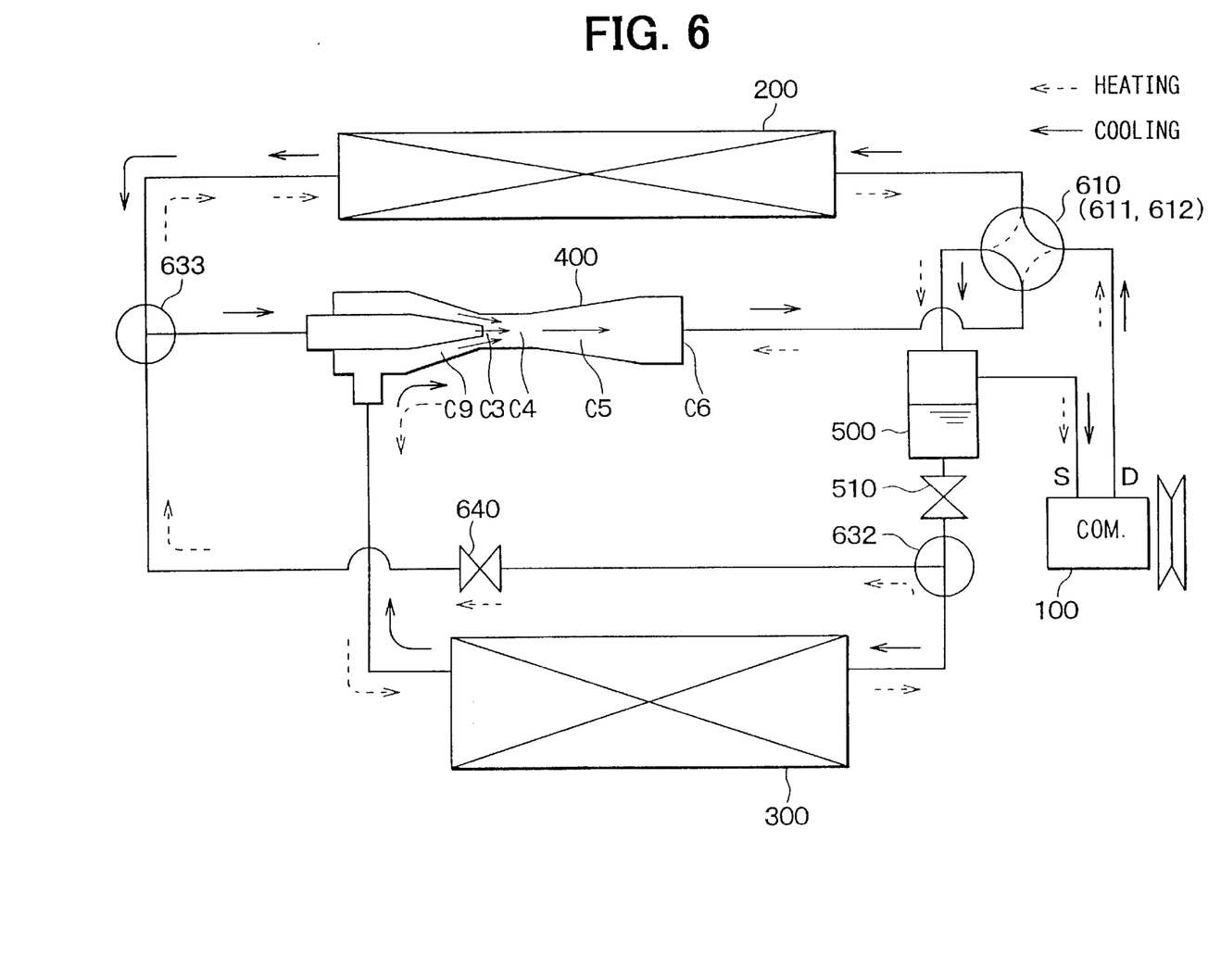
FIG. 6 is a schematic diagram showing an ejector cycle system according to a third preferred embodiment of the present invention.

A third preferred embodiment of the present invention will be now described with reference to FIG. 6. In the third embodiment, as shown in FIG. 6, the two-way valve 630 described in the second embodiment in FIG. 4 is omitted, and refrigerant circuit is constructed using both three-way valves 632, 633. In an ejector cycle system of the third embodiment, the other parts are similar to those in the ejector cycle system described in the first and second embodiments.

Accordingly, in the cooling operation of the ejector cycle system of the third embodiment, refrigerant discharged from the compressor 100 flows through the first four-way valve 610, the exterior heat exchanger 200, the three-way valve 633, the ejector 400, the first four-way valve 610 and the gas-liquid separator 500 in this order, and is introduced into the compressor 100. Further, liquid refrigerant from the gas-liquid separator 500 circulates the restriction device 510, the three-way valve 632, the interior heat exchanger 300, the ejector 400 (the mixing portion 420, the diffuser 430), the first four-way valve 610 and the gas-liquid separator 500 in this order.

On the other hand, in the heating operation, refrigerant from the compressor 100 circulates the first four-way valve 610, the diffuser 430, the mixing portion 420, the interior heat exchanger 300, the three-way valve 632, the fixed restrictor 640, the three-way valve 633, the exterior heat exchanger 200, the first four-way valve 610, the gas-liquid separator 500 and the compressor 100, in this order. In the heating operation, the diffuser 430 and the mixing portion 420 of the ejector 400 are only used as a refrigerant passage.

In the third embodiment of the present invention, the high-pressure side refrigerant is decompressed in the cooling operation by using the nozzle 410 of the ejector 400, while is decompressed in the heating operation by using the fixed restrictor 640. Therefore, in the third embodiment, the advantage for increasing the heating temperature in the heating operation, similar to the above-described second embodiment, can be obtained.

Figure 7:
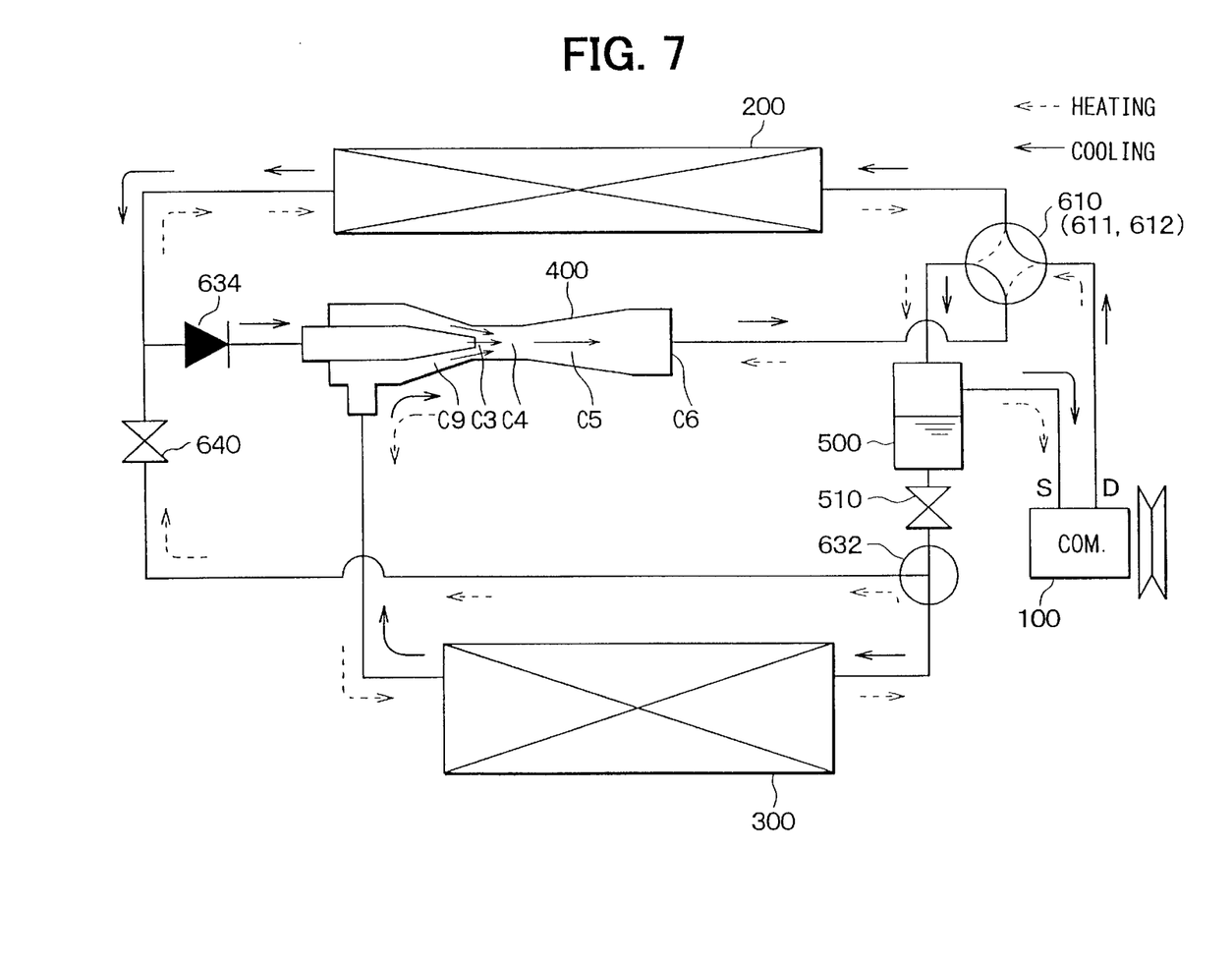
FIG. 7 is a schematic diagram showing an ejector cycle system according to a fourth preferred embodiment of the present invention.

A fourth preferred embodiment of the present invention will be now described with reference to FIG. 7. In the fourth embodiment, as shown in FIG. 7, the two-way valve 630 described in the second embodiment is eliminated, and a refrigerant circuit is constructed using a three-way valve 632 and a check valve 634.

According to the fourth embodiment of the present invention, in the cooling operation, refrigerant discharged from the compressor 100 circulates the first four-way valve 610, the exterior heat exchanger 200, the check valve 634, the ejector 400, the first four-way valve 610, the gas-liquid separator 500 and the compressor 100, in this order. Further, refrigerant to be sucked into the ejector 400 flows from the gas-liquid separator 500 to the gas-liquid separator 500 through the restriction device 510, the three-way valve 632, the interior heat exchanger 300, the ejector 400 (the mixing portion 420, the diffuser 430) and the first four-way valve 610 in this order.

On the other hand, in the heating operation, refrigerant from the compressor 100 circulates the first four-way valve 610, the diffuser 430, the mixing portion 420, the interior heat exchanger 300, the three-way valve 632, the fixed restrictor 640, the exterior heat exchanger 200, the first four-way valve 610, the gas-liquid separator 500 and the compressor 100, in this order. Similarly to the above-described third embodiment, in the heating operation, the diffuser 430 and the mixing portion 420 are only used as a refrigerant passage.

In the fourth embodiment of the present invention, the high-pressure side refrigerant is decompressed in the cooling operation by using the nozzle 410 of the ejector 400, while is decompressed in the heating operation by using the fixed restrictor 640. Therefore, in the fourth embodiment, the advantage for increasing the heating temperature in the heating operation, similar to the above-described second embodiment, can be obtained.

Figure 8A:
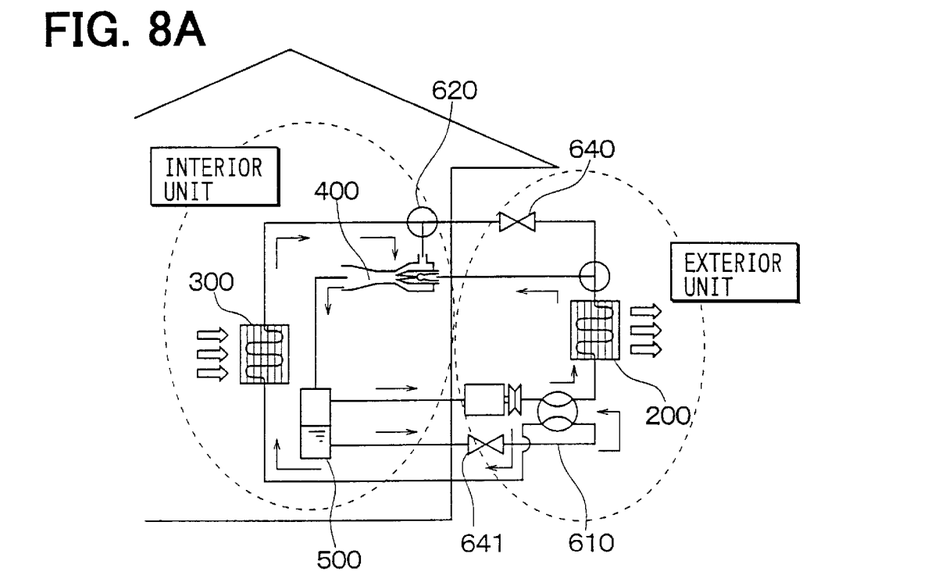
FIGS. 8A, 8B are schematic diagrams showing an ejector cycle system according to a fifth preferred embodiment of the present invention.
Figure 8B:
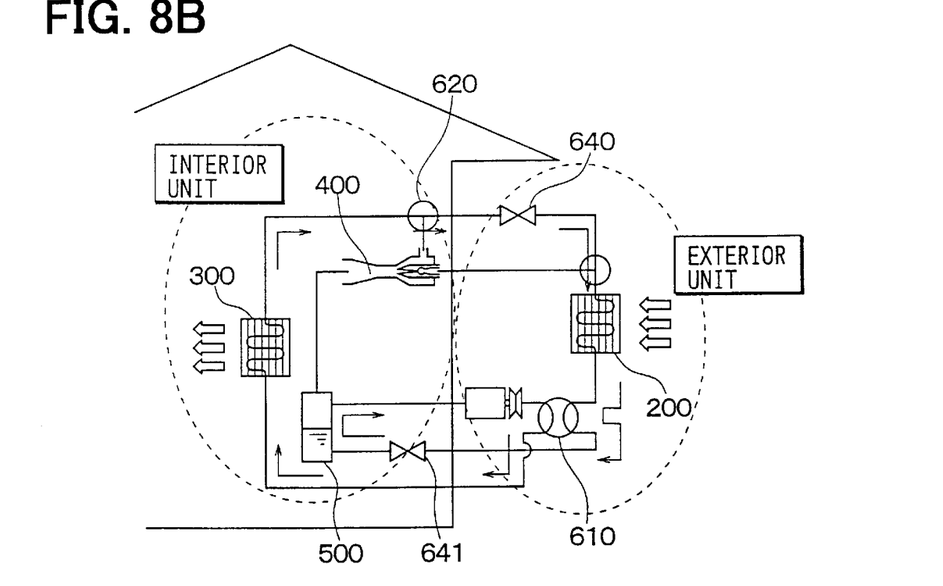

A fifth preferred embodiment of the present invention will be now described with reference to FIGS. 8A and 8B. In the fifth embodiment, as shown in FIGS. 8A and 8B, the ejector

400 is disposed inside a compartment (e.g., passenger compartment), and the decompression device (e.g., expansion valve) 640 for decompressing refrigerant is disposed outside the compartment (e.g., passenger compartment). FIG. 8A shows the cooling operation in an ejector cycle system, and FIG. 8B shows the heating operation in the ejector cycle system. A refrigerant adjustment valve 641 for adjusting a refrigerant-flowing amount is disposed in the fifth embodiment.

In the fifth embodiment, in the cooling operation, the length of a refrigerant passage between the ejector 400 as a decompression device and the interior heat exchanger 300 as an evaporator can be made shorter, and the pressure loss in the refrigerant passage therebetween becomes smaller. Therefore, an amount of refrigerant circulating in the ejector cycle system increases, and cooling performance of the ejector cycle system increases in the cooling operation. Similarly, in the heating operation, the length of a refrigerant passage between the expansion valve 640 as a decompression device and the exterior heat exchanger 200 as an evaporator can be made shorter, and the pressure loss in the refrigerant passage therebetween becomes smaller. Therefore, the refrigerant-circulating amount in the heating operation increases, and heating performance of the ejector cycle system increases in the heating operation.

In the fifth embodiment, an interior unit, disposed inside the compartment, is constructed by the interior heat exchanger 300, the ejector 400, the gas-liquid separator 500 and the like. Further, the exterior unit, disposed outside the compartment, is constructed by the exterior heat exchanger 200, the compressor 100, the expansion valve 640 and the like. Both the interior unit and the exterior unit are connected to each other by refrigerant piping.

Even in the fifth embodiment of the present invention, the high-pressure side refrigerant is decompressed in the cooling operation by using the nozzle 410 of the ejector 400, while is decompressed in the heating operation by using the fixed restrictor 640. Therefore, in the fifth embodiment, the advantage for increasing the heating temperature in the heating operation, similar to the above-described second embodiment, can be obtained.

Figure 9A:
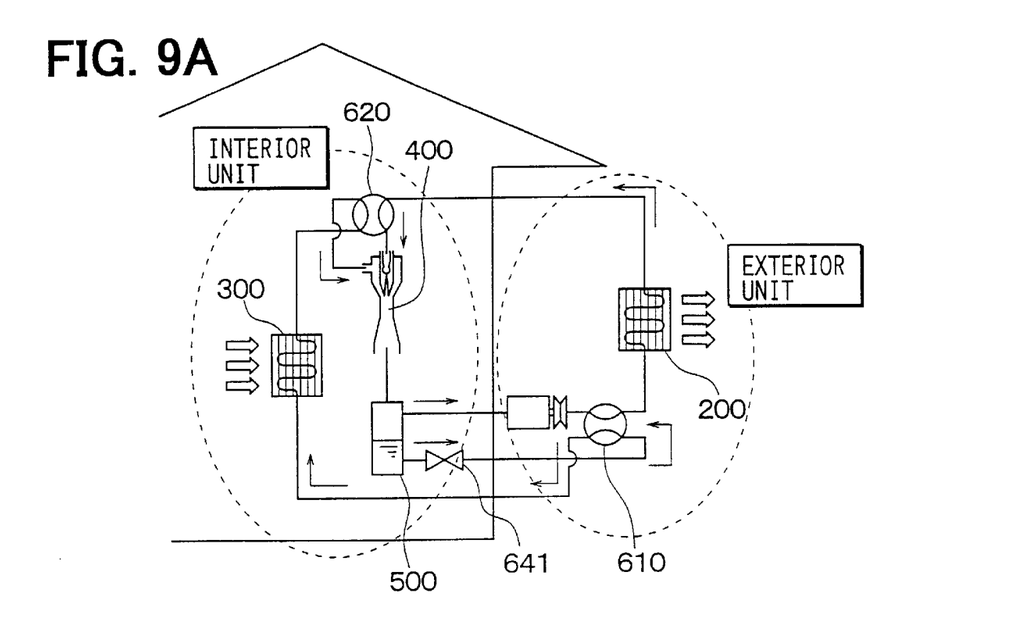
FIGS. 9A, 9B are schematic diagrams showing an ejector cycle system according to a sixth preferred embodiment of the present invention.
Figure 9B:
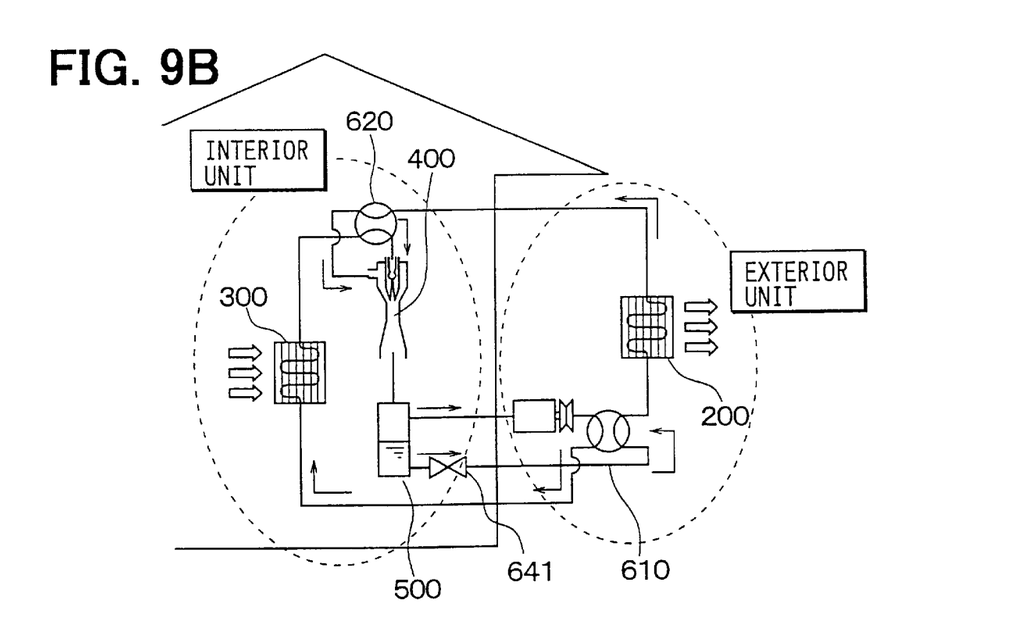

A sixth preferred embodiment of the present invention will be now described with reference to FIGS. 9A and 9B. FIG. 9A shows the cooling operation in an ejector cycle system of the sixth embodiment, and FIG. 9B shows the heating operation in the ejector cycle system of the sixth embodiment. In the sixth embodiment, the refrigerant flow in each of the exterior heat exchanger 200 and the interior heat exchanger 300 is equal in both the cooling operation and the heating operation, similarly to the above-described first embodiment. In the sixth embodiment, the ejector 400 is disposed inside the compartment similarly to the fifth embodiment. Thus, in the cooling operation, the length of a refrigerant passage between the ejector 400 as a decompression device and the interior heat exchanger 300 as an evaporator, can be made shorter, and the pressure loss in the refrigerant passage therebetween becomes smaller. Therefore, the refrigerant-circulating amount increases, and cooling performance of the ejector cycle system increases in the cooling operation.

In the heating operation, the length of a refrigerant passage between the ejector 400 as a decompression device and the exterior heat exchanger 200 as an evaporator becomes longer. However, in the heating operation, since the compression operation of the compressor 100 is also used as a heating thermal source, the refrigerant-circulating amount can be made smaller than that in the cooling operation. Therefore, even when the refrigerant passage therebetween is set longer in the heating operation, it can restrict large pressure loss from being generated in the refrigerant passage.

Although the present invention has been fully described in connection with the preferred embodiments thereof with reference to the accompanying drawings, it is to be noted that various changes and modifications will become apparent to those skilled in the art.

For example, in the ejector cycle system according to each above-described embodiment, carbon dioxide is used as refrigerant, and the pressure of carbon dioxide at the high-pressure side is set equal to or higher than the critical pressure of carbon dioxide. However, the present invention can be applied to an ejector cycle system where refrigerant such as hydrocarbon and fluorocarbon (flon) is used and the pressure of the high-pressure side refrigerant is lower than the critical pressure of the refrigerant. Further, the above-described first embodiment can be combined with any one of the above-described second through fourth embodiments.

Further, in the above-described second through fourth embodiments, the other decompression device such as a thermal expansion valve may be used in place of the fixed restrictor (e.g., capillary tube).

Such changes and modifications are to be understood as being within the scope of the present invention as defined by the appended claims.

What is claimed is:

1. An ejector cycle system comprising:

a compressor for sucking and compressing refrigerant;

an exterior heat exchanger for performing heat-exchange between the refrigerant and air outside a compartment;

an interior heat exchanger for performing heat-exchange between the refrigerant and air inside the compartment;

an ejector including a nozzle for converting a pressure energy of high-pressure side refrigerant to a speed energy so that the high-pressure side refrigerant is decompressed and expanded, and a pressure-increasing portion in which the speed energy is converted to the pressure energy so that the pressure of refrigerant is increased while refrigerant discharged from the nozzle and gas refrigerant sucked from a low-pressure side are mixed;

a gas-liquid separator for separating refrigerant from the ejector into gas refrigerant and liquid refrigerant, and for storing refrigerant therein and a switching device disposed to switch one of a cooling operation where refrigerant in the interior heat exchanger absorbs heat from the compartment to cool the compartment and a heating operation where refrigerant in the interior heat exchanger radiates heat to the compartment to heat the compartment, wherein:

in the cooling operation, a flow direction of refrigerant flowing through one of the exterior heat exchanger and the interior heat exchanger is identical to a flow direction of refrigerant flowing through the one of the exterior heat exchanger and the interior heat exchanger in the heating operation.

2. The ejector cycle system according to claim 1, wherein:

in the cooling operation, the flow direction of refrigerant flowing through the exterior heat exchanger is identical to that in the heating operation, and the flow direction of refrigerant flowing through the interior heat exchanger is identical to that in the heating operation.

3. The ejector cycle system according to claim 1, wherein the ejector is disposed inside the compartment.

4. The ejector cycle system according to claim 1, wherein one of carbon dioxide, fluorocarbon and hydrocarbon is used as the refrigerant.

5. An ejector cycle system comprising:

a compressor for sucking and compressing refrigerant;

an exterior heat exchanger for performing heat-exchange between the refrigerant and air outside a compartment;

an interior heat exchanger for performing heat-exchange between the refrigerant and air inside the compartment;

an ejector including a nozzle for converting a pressure energy of high-pressure side refrigerant to a speed energy so that the high-pressure side refrigerant is decompressed and expanded, and a pressure-increasing portion in which the speed energy is converted to the pressure energy so that the pressure of refrigerant is increased while refrigerant discharged from the nozzle and gas refrigerant sucked from a low-pressure side are mixed;

a gas-liquid separator for separating refrigerant from the ejector into gas refrigerant and liquid refrigerant, and for storing refrigerant therein;

a first switching unit for switching one of a case where refrigerant flows from the compressor toward the exterior heat exchanger and a case where refrigerant flows from the compressor toward the interior heat exchanger;

a second switching unit for switching one of a case where liquid refrigerant flows from the gas-liquid separator toward the interior heat exchanger and a case where liquid refrigerant flows from the gas-liquid separator toward the exterior heat exchanger;

a third switching unit for switching one of a case where refrigerant flows from the exterior heat exchanger into the nozzle and a case where refrigerant flows from the interior heat exchanger into the nozzle; and a fourth switching unit for switching one of a case where refrigerant flows from the interior heat exchanger into the pressure-increasing portion and a case where refrigerant flows from the exterior heat exchanger into the pressure-increasing portion.

6. The ejector cycle system according to claim 5, wherein the ejector is disposed inside the compartment.

7. The ejector cycle system according to claim 5, wherein one of carbon dioxide, fluorocarbon and hydrocarbon is used as the refrigerant.

8. An ejector cycle system comprising:

a compressor for sucking and compressing refrigerant;

an exterior heat exchanger for performing heat-exchange between the refrigerant and air outside a compartment;

an interior heat exchanger for performing heat-exchange between the refrigerant and air inside the compartment;

an ejector including a nozzle for converting a pressure energy of high-pressure side refrigerant to a speed energy so that the high-pressure side refrigerant is decompressed and expanded, and a pressure-increasing portion in which the speed energy is converted to the pressure energy so that the pressure of refrigerant is increased while refrigerant discharged from the nozzle and gas refrigerant sucked from a low-pressure side are mixed;

a gas-liquid separator for separating refrigerant from the ejector into gas refrigerant and liquid refrigerant, and for storing refrigerant therein;

a decompression unit for decompressing refrigerant flowing from the interior heat exchanger;

a switching device disposed to switch one of a cooling operation where liquid refrigerant from the gas-liquid separator is evaporated in the interior heat exchanger by absorbing heat from the compartment, and a heating operation where gas refrigerant discharged from the compressor is condensed in the interior heat exchanger by radiating heat to the compartment, wherein:

in the cooling operation, refrigerant discharged from the compressor passes through the exterior heat exchanger and is decompressed by the ejector; and in the heating operation, refrigerant discharged from the compressor passes through the interior heat exchanger and is decompressed by the decompression unit.

9. The ejector cycle system according to Claim 8, wherein the decompression unit is a fixed restrictor having a fixed open degree.

10. The ejector cycle system according to Claim 8, wherein the decompression unit is an expansion valve.

11. The ejector cycle system according to claim 8, wherein:

the ejector is disposed inside the compartment; and the decompression unit is disposed outside the compartment.

12. The ejector cycle system according to claim 11, wherein the receiver is disposed inside the compartment, and the compressor is disposed outside the compartment.

13. The ejector cycle system according to claim 8, wherein one of carbon dioxide, fluorocarbon and hydrocarbon is used as the refrigerant.

14. The ejector cycle system according to Claim 1, wherein the switching device includes;

a first switching valve for switching one of a case where refrigerant flows from the compressor toward the exterior heat exchanger and a case where refrigerant flows form the compressor toward the interior heat exchanger, a second switching valve for switching one of case where liquid refrigerant flows form the gas-liquid separator toward the interior heat exchanger and a case where liquid refrigerant flows from the gas-liquid separator toward the exterior heat exchanger, a third switching valve for switching one of a case where refrigerant flows from the exterior heat exchanger into the nozzle and a case where refrigerant flows from the interior heat exchanger into the nozzle, and a fourth switching valve for switching one of a case where refrigerant flowing through the interior heat exchanger is sucked into the pressure-increasing portion and a case where refrigerant flowing through the exterior heat exchanger is sucked into the pressure-increasing portion.

15. The ejector cycle system according to Claim 14, wherein the first switching valve and the second switching valve are constructed by a first four-way valve unit, and the third switching valve and the fourth switching valve are constructed by a second four-way valve unit.

16. The ejector cycle system according to Claim 1, wherein:

in the cooling operation, liquid refrigerant in the gas-liquid separator flows through the interior heat exchanger to be evaporated in the interior heat exchanger and is directly sucked into the pressure-increasing portion of the ejector, while refrigerant discharged from the compressor flows through the exterior heat exchanger and the nozzle of the ejector; and in the heating operation, liquid refrigerant in the gas-liquid separator flows through the exterior heat exchanger to be evaporated in the exterior heat exchanger and is directly sucked into the pressure-increasing portion of the ejector, while refrigerant discharged from the compressor flows through the interior heat exchanger and the nozzle of the ejector.

17. An ejector cycle system comprising:

a compressor for sucking and compressing refrigerant;

an exterior heat exchanger for performing heat-exchange between the refrigerant and air outside a compartment the exterior heat exchanger receiving compressed refrigerant directly from the compressor in a cooling cycle;

an interior heat exchanger for performing heat-exchange between the refrigerant and air inside the compartment the interior heat exchanger receiving compressed refrigerant directly from the compressor in a heating cycle;

an ejector including a nozzle for converting a pressure energy of high-pressure side refrigerant to a speed energy so that the high-pressure side refrigerant is decompressed and expanded and a pressure-increasing portion in which the speed energy is converted to the pressure energy so that the pressure of refrigerant is increased while refrigerant discharged from the nozzle and gas refrigerant sucked from a low-pressure side are mixed; and a gas-liquid separator for separating refrigerant into gas refrigerant and liquid refrigerant, and for storing refrigerant therein, wherein:

a flow direction of refrigerant flowing through at least one of the exterior heat exchanger and the interior heat exchanger is identical during the heating cycle and the cooling cycle.

* * * * *